July 23, 1963 G. FRANKEL 3,098,416
MEANS FOR PRODUCING OR CONTROLLING MOVEMENTS
Filed July 23, 1959 3 Sheets-Sheet 2
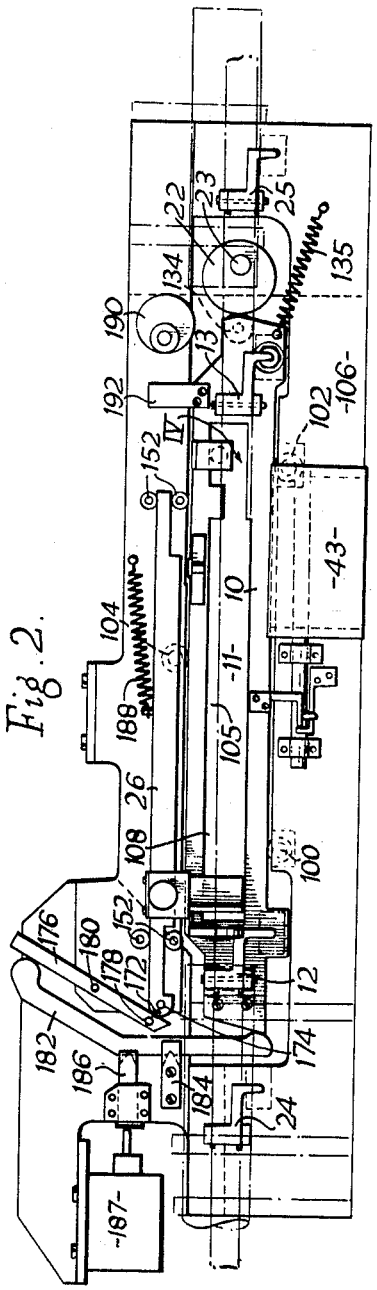
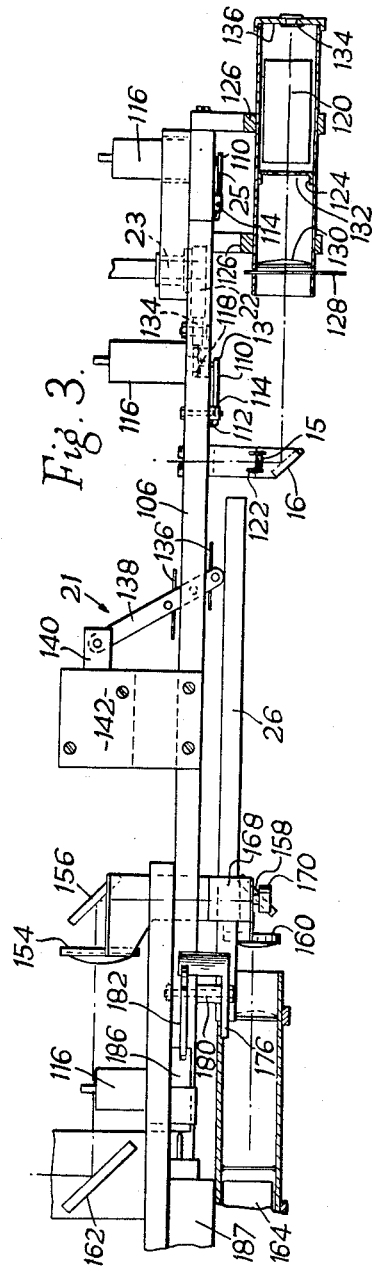
INVENTOR
BY
ATTORNEY July 23, 1963

G. FRANKEL 3,098,416

MEANS FOR PRODUCING OR CONTROLLING MOVEMENTS

Filed July 23, 1959

INVENTOR

BY

ATTORNEY

United States Patent Office 3,098,416
Patented July 23, 1963

3,098,416
MEANS FOR PRODUCING OR CONTROLLING MOVEMENTS
Gerald Frankel, Wembley Park, England, assignor to Caps Limited, London, England
Filed July 23, 1959, Ser. No. 829,019
Claims priority, application Great Britain July 25, 1958
7 Claims. (Cl. 95—4.5)

This invention relates to means for producing or controlling movements in accordance with positional or dimensional requirements.

Such means are required in many types of apparatus, for example in machine tools and in typographical apparatus. Thus, in machine tools means are required for automatically controlling the position and amount of movement of a tool performing work. In photographic type composing apparatus or other apparatus in which characters or other material or information are reproduced by the intermittent and successive projection of images on to a radiation-sensitive film or plate, means are required for moving the film or plate the required distance in the intervals between the projections.

The positional and dimensional requirements of movements in apparatus of the kind referred to may vary within specified limits and it is an object of the invention to provide a simple and effective means for effecting and controlling movements in accordance with varying requirements.

The control means of the invention for controlling the movement of a movable element in accordance with dimensional and positional requirements comprises means for transmitting or projecting a radiation signal representing a dimensional or positional requirement and a radiation-sensitive device for sensing the signal and setting into action driving or stopping means for starting or stopping the movement of the movable element. Means are also provided for producing a relative movement between the signal and the sensing device during which the signal is sensed to permit of variations of the dimensional or positional requirements. For producing this relative movement the sensing device may be moved and the signal remain stationary or vice versa. The signal may be moved, for example by movement of an aperture through which radiant energy in the form of light is being projected. The movement of the radiation-sensitive device, for example a photoelectric cell when light radiation is used, may be effected by movement of the radiation-sensitive device itself or of a device which picks up the signal and transmits it to the radiation-sensitive device. Thus when using light and a light-sensitive cell a movable mirror may be used to pick up the light signal and reflect this onto the cell which itself may be stationary. By using the relative movement to sense or measure a requirement, e.g. one end of a dimension starting from a fixed position, an infinite variation, within the specified limits of the requirement can be obtained. The signal forming means or the sensing means may be moved by the movable element and may be located thereon to be moved therewith to meet a positional or dimensional requirement. The radiation used may suitably be any form of electro-magnetic radiation, but light radiation may advantageously be used. Light radiation as referred to herein includes ultra-violet radiation and infra-red radiation which lie outside the visible spectrum.

The invention also consists in means for advancing a movable element in controlled intermittent steps for use with the control means referred to in the preceding paragraph, which comprises a movable carrier provided with one or more releasable gripping devices for holding the movable element, means for moving the carrier the selected distance from a fixed starting point and means for returning the carrier to its starting position. In the operation of the said advancing means the carrier is moved from its starting position with the gripping devices in the release position so that the movable element remains stationary. The return movement of the carrier to its starting position is made with the gripping devices gripping the movable element so that it is advanced during this return movement that distance which the carrier has been moved from its starting position. The control means of the invention is used to control this distance.

The invention also consists in a modification of the advancing means set forth in the preceding paragraph, which comprises a movable carrier arranged to perform an outward and return movement of fixed dimension from a fixed starting position, releasable grippers carried by the carrier and adapted to grip the movable element, a follower lighter in weight than the carrier and biassed to move with the carrier during the outward movement of the carrier and arranged to be returned to its starting position by the carrier during the return movement of the latter, braking means for stopping the movement of the follower during its outward movement, means for releasing the braking means to permit the return movement of the follower, means for actuating the grippers to grip the movable element when the follower commences its return movement, and means for releasing the grippers when the follower or carrier completes the return movement. In operation of this modified form of advancing means, the movable carrier is moved from its starting position with the grippers in the released position so that the movable element remains stationary. The follower is moved with the carrier until a signal indicative of the distance the movable element is to be advanced in the next step is received and actuates the brake to stop the follower. The carrier continues to move to complete its outward movement and then commences its return movement. During this return movement it picks up the follower once again and as it does this the brake holding the follower is released and the grippers on the carrier are actuated to grip the movable element. The carrier and follower then return to the fixed starting position, the carrier taking the movable element with it. When the carrier reaches the fixed starting position the grippers are released and the carrier and follower recommence the outward movement. The movable element will have been advanced in the cycle described a distance equal to that travelled by the follower in its return movement which is, of course, the same as the distance travelled by the follower in its outward movement.

The invention may be used with particular advantage in photographic type composing apparatus, such as is referred to in pending application No. 771,356, now abandoned, in which images of characters are intermittently and successively projected onto a radiation-sensitive film in the form of a tape and the tape is advanced in controlled intermittent steps in the intervals between the projections.

For the recording of characters of different widths in such apparatus, the means for moving the carrier from its starting point may be such that it will move the carrier a distance which is at least equal to the maximum width required for any of the characters to be recorded and a brake is provided for stopping the movement of the carrier (or of its follower) in response to a radiation signal indicating the character width required and sensed by a radiation-sensitive device which actuates the brake. The movement of the carrier from its starting position takes place during the exposure periods and it is returned to its starting position during the dark periods when no exposure is taking place. Thus the movement of the carrier may be effected in synchronism with that of the shutter of the projection system. The brake for stopping the movement of the carrier or its follower as the case may be, may be an electro-magnetic brake controlled by a photoelectric cell or other radiation-sensitive device onto which light or other radiant energy signals may be reflected by a mirror carried by the carrier. The radiation-sensitive device may itself be carried by the carrier and the reflecting mirror dispensed with.

The character width signals may be produced in the following manner. Associated with each character of the matrix is a thin line aperture positioned above or below the characters outside the projection area of the characters and in line with (or slightly inset as explained hereinafter) the right hand body line of the character for left to right reading or with the left hand body line for right to left reading. An image of this mark is projected, e.g. by a light source and associated optical system, during the period of exposure of its associated character, above or below the tape onto which the character is being projected and is picked up as a radiation signal by the mirror or radiation-sensitive device referred to, during the movement of the carrier away from its fixed starting position in which the mirror or radiation-sensitive device is normally aligned on the tape alignment line referred to below. When picked up by a mirror, the radiation signal is reflected onto the radiation-sensitive device. The radiation-sensitive device acts in known fashion to energise the electro-magnetic brake to stop the carrier (or follower). When the exposure period ends and the carrier returns to its starting position, it advances the tape a distance corresponding to the body width required for the character which has just been recorded. Each character is always exposed in a position in which its left hand body line or right hand body line as the case may be, is in alignment with a fixed imaginary line in the plane of the tape hereinafter referred to as the "tape alignment line." The character width is the distance between the left hand and right hand body lines of the character. By this means an infinite variation of character widths within specified limits can be obtained.

The tape advancing means of the invention may be used in conjunction with the character matrix and selection apparatus described in co-pending patent application S.N. 828,109, filed July 20, 1959, now Patent No. 3,045,567. The carrier may be returned to its starting position on each occasion by the rotation of an eccentric cam mounted on a shaft coupled to the shaft of the shutter for rotation therewith. The two shafts are coupled so that the return of the carrier to its starting position, taking the tape with it, occurs during the period in which the shutter occludes light from the projection lamp and the movement of the carrier away from its starting position, which may be effected by a spring pulling the carrier into contact with the cam, is permitted during the rotation of the shutter during its exposure period.

Normally there will be a slight delay period which may be, for example, of the order of about 4½ milliseconds, between the sensing of the light signal by the radiation-sensitive device and the braking operation. For characters of the same point size, this delay may be compensated for by insetting or setting back the thin line aperture associated with each character and indicating its width. However, when the size of the characters is altered by the use of a projection system including a magnification lens system to provide variations in size, the insetting distance will be altered on magnification or reduction in size but the delay period remains the same and therefore the compensation for the delay will not be accurate. To overcome this difficulty a conic cam which is adjustable in position for different sized characters or a cam with a continuously accelerating cam surface may be used to move the carrier on its return movement, whereby varying linear speeds of movement of the carrier may be obtained.

Means may also be provided as described hereinafter for applying signals to the tape indicating the beginning of line of copy, selected end of line of copy, actual end of line of copy and additional signals for use in left hand alignment, right hand alignment, centering and justification.

The invention is illustrated by the accompanying drawings in which—

FIGS. 2 and 3 are views in elevation and plan respectively of a tape advancing means constructed and arranged to operate in accordance with the invention;

Figure 1:
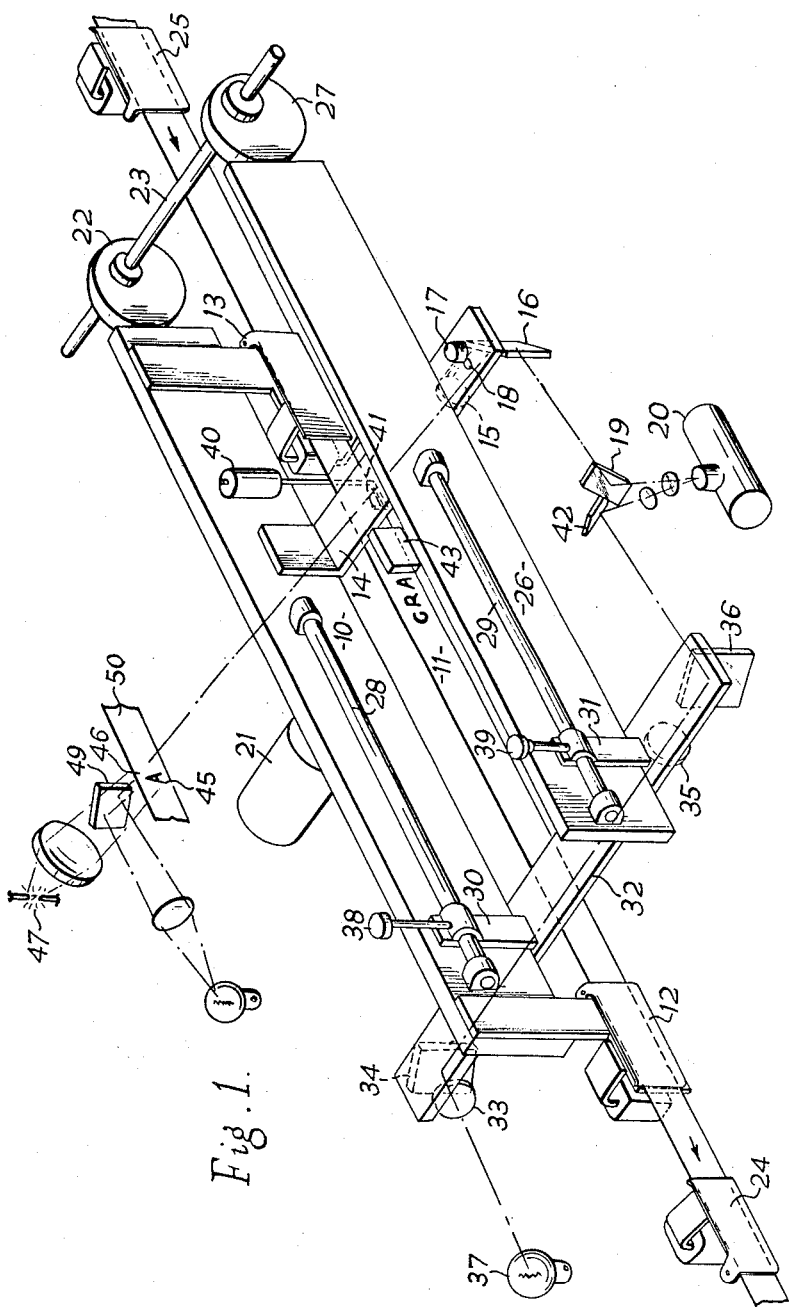
FIG. 1 illustrates diagrammatically and schematically means in accordance with the invention for effecting and controlling the movement of a radiation-sensitive tape on which composing takes place in a photographic type composing machine.

Referring to FIG. 1 of the drawings, the bar 10 which is mounted to slide to and fro in its longitudinal direction acts as the movable carrier for advancing the radiation-sensitive tape 11 and is provided with electro-magnetic grippers 12 and 13 for gripping the tape 11. A bracket 14 attached to the bar 10 carries a lens 15 and a mirror 16. The lens 15 and mirror 16 are positioned to pick up light coming from the light source, used for projecting images of the characters, passing above the tape 11. The lens 15 and mirror 16 are carried by a pin 17 which is movable in a slot 18 in bracket 14 so that they may be moved as a unit in a direction parallel to the tape. The mirror 16 is positioned at an angle with respect to the tape 11 so that light passing in a direction normal to the tape 11 is reflected therefrom onto a second mirror 19 and thence onto photoelectric cell 20. An electro-magnetic brake 21 which is energised through a relay when light falls on cell 20 and causes a current impulse to be produced is located adjacent the bar 10 and acts to stop the movement of the bar 10 when energised. The bar 10 is normally held against the surface of the eccentric cam 22 by a spring (not shown). The cam 22 is driven by a shaft 23 which is coupled to the drive of the shutter of the optical projection system of the apparatus.

Two additional electro-magnetic grippers 24 and 25 are provided for holding the tape 11 taut when grippers 12 and 13 are not operating. The grippers 24 and 25 are arranged to start functioning on grippers 12 and 13 ceasing to function and to cease functioning on grippers 12 and 13 starting to function. This may be achieved by switches actuated by cams run in synchronism with cam 22 so that grippers 24 and 25 operate during the outward movement of bar 10 and grippers 12 and 13 during its return movement.

The throw of the cam 22 is at least equal to the maximum width of character plus character spacing that will be required.

The apparatus as illustrated operates for the composing of material reading from left to right. It may be used with the Kalfax film referred to in pending patent application No. 771,356 and an ultra-violet light source suitable for use with this film, and with the character selection apparatus of pending patent application S.N. 828,109, filed July 20, 1959.

Kalfax is the trade name of a radiation sensitive material produced by the Kalvar Corporation of New Orleans, Louisiana, United States of America. It is sensitive only to light in the near ultra-violet region of the spectrum and does not require dark-room conditions for operation.

After exposure, it can be developed by heating to 255° F. for about 2 seconds and even less by contact with a heated surface or by radiant heat. Development may follow immediately after exposure and the developed film may then be used for viewing.

In operation, the cam 22 makes a single revolution for each exposure of a character. At the beginning of this revolution the bar 10 is held in its fixed starting position (in the left hand position looking at the drawing) by the cam 22 utilizing its maximum throw. In this position the lens 15 and mirror 16 are aligned on the tape alignment line for normal character width spacing. The cam 22 begins its rotation when the exposure of a character commences (by rotation of the shutter of the optical projection system) and the bar 10 is moved to the right under the action of the spring as the cam surface moves away from it. The bar 10 takes with it the bracket 14, lens 15 and mirror 16.

In addition to projecting an image of the character 45 onto the tape 11 the projection system projects a light signal passing through a thin line aperture 46 associated with the character 45 which is being exposed and located above the character in line with its right hand body line to indicate the character width. This signal which passes above the tape 11 is picked up by the lens 15 and mirror 16 when the bar 10 has moved a distance equal to the character width, and it is reflected onto mirror 19 and photoelectric cell 20. When this happens the brake 21 is actuated to stop further movement of the bar 10. Cam 22 will continue to move freely away from the bar 10 during the rest of the exposure period. At the end of the exposure period the light signal projected onto mirror 16 is cut off, the electro-magnetic brake 21 is released and the grippers 12 and 13 are brought into operation. The shutter continues its rotation, whilst occluding light from the projection unit, to the position at which it is ready to commence exposure once again, and drives the cam shaft 23 to return the cam 22 to its starting position. This movement of the cam 22 also takes the bar 10 back to its starting position, carrying the tape 11 held by the grippers 12 and 13 with it. The tape 11 is thus advanced a distance corresponding to the width required for the character which has just been exposed. Additional spacing between the characters may be provided by adjusting the position of mirror 16 and lens 15 on bracket 14 by movement of pin 17 in slot 18.

The character width signals can also be used under normal photographic dark room conditions using secondary radiation suitably filtered or chosen so as not to affect the film in use.

The light source 47 (an ultra-violet light source is used when Kalfax film is used) may be used to project the character width signal as well as the character. Preferably, however, a low voltage filament lamp 48 is used to provide light for projection of the character width signal. The light from lamp 48 is reflected by mirror 49 through the character matrix 50 and associated optical system. The mirror 49 may be relatively small so as not to interfere with the light from source 47 or it may be a dichroic mirror which reflects white light and passes ultra-violet light.

In addition to the components described above, the apparatus illustrated in the drawings also includes a second slidable bar 26 held by a spring in contact with the cam surface of a second eccentric cam 27 mounted on the shaft 23. Cam 27 has twice the throw of cam 22 and moves together with cam 22 so that when cam 22 has moved the bar 10 the full distance of its throw, cam 27 has moved bar 26 twice this distance. On the reverse movement under the action of the springs the bar 10 travels half the distance that the bar 26 travels.

Slidably mounted on the rods 28 and 29 carried by the bars 10 and 26 respectively are two brackets 30 and 31 which carry a cross-piece 32, one end of which carries a lens 33 and mirror 34 and the other end of which carries a lens 35 and mirror 36. Mirrors 34 and 36 are arranged to reflect light from a suitable light source 37 onto a mirror 42 which in turn reflects the light onto photoelectric cell 20.

The cross-piece 32 may be arranged to move with bar 10 by tightening pin 38 and loosening pin 39 or to move with bar 26 by loosening pin 38 and tigthening pin 39.

A solenoid 40 fixedly attached to bar 10 and actuated from the keyboard of the machine carries a thin metal strip 41 which is lifted on energising the solenoid 40 and dropped when the solenoid is de-energised. In its upper position, the strip 41 is adjacent the tape 11, between the tape 11 and the light source and obscures a strip of the tape 11 below the projection area and will on exposure and development cause a vertical translucent line to be formed across a black border (with Kalfax film) on the bottom part of the tape 11.

In the fixed starting position of the bar 10 the strip 41 is in alignment with the tape alignment line.

The solenoid 40 may be a double acting solenoid moving strip 41 to two different levels, in one of which it causes a short line to be formed on the tape and in the other of which it causes a longer line to be formed.

The operation of the apparatus described above to form stop marks on the tape 11 for use in the subsequent left hand alignment, right hand alignment, centering or justification will now be described.

Kalfax film is used as the tape 11 and the latent images of the characters formed in the sensitive surface of the tape are developed on the tape by the application of heat by heater 43 when they move out of the projection area, as described in pending application No. 771,356.

To form a beginning of line signal on tape 11, a second solenoid (not shown), similar to solenoid 40, and attached to bar 10 in the reverse position so as to project a strip downwardly across the upper border of the tape 11 when energised, is energized from the keyboard when the first character of the line is being exposed and an image of the strip is projected onto the upper border of the tape forming a translucent line on a black border which will be in alignment with the left hand body line of the first character. The strip of this second solenoid is in alignment with the tape alignment line when the bar 10 is in its fixed starting position.

For providing a stop mark for use for right hand alignment in the subsequent make-up of the copy, the solenoid 40 is energised when the last character has been exposed and the tape 11 advanced the necessary character width. This causes strip 41 to be raised and the tape is exposed to form an image of the strip on the lower border thereof which will be in alignment with the right hand body line of the last character and serves as the right hand alignment stop mark.

For providing a left hand alignment stop mark the carriage (30, 31, 32) carrying sensing mirror 36 is linked to bar 10 to move therewith by screw 38 and is freed to move along rod 29 of bar 26. The carriage is so located in its fixed position on bar 10 that the optical axis of the lens 35 and mirror 36 is at a distance from that of lens 15 and mirror 16 equal to the selected length of line. After exposure of the last character in the line and advancement of the tape the necessary character width, light source 37 is switched on and cam 22 is moved a half-turn to enable bar 10 with the grippers 12 and 13 in the relased position to move from its fixed starting position to the right until mirror 36 senses the beginning of copy signal (i.e. light from light source 37 passing through beginning of copy signal on tape) which is reflected onto photo-electric cell 20 to apply the brake 21. In this position the solenoid 40 is actuated and strip 41 exposed to apply a left hand alignment stop mark to the lower border of tape 11. This is followed by the release of the brake and the return of the bar 10 to its starting position. The shaft 23 of the cam 22 is coupled with that of the shutter in such manner that it is possible to move cam 22 from its rest position a half-turn without actuating the shutter. The shutter will pick up the drive again on being actuated.

For subsequent centering of the line of copy the stop mark is required to be formed on tape 11 at a distance from the last character to be typed equal to half the distance between the actual length of line of copy and the selected length of line of copy.

The centering stop mark is applied in the following manner.

The lens 35 and mirror 36 are again located so that their optical axis is spaced from that of lens 15 and mirror 16 a distance equal to the selected length of line. In this case, however, the carriage 30, 31, 32 is tied to the bar 26 and freed for movement along rod 28 of bar 10. Cams 22 and 27 are moved a half-turn and this causes the sensing mirror 36 to move until it picks up the beginning of line signal and thus actuates brake 21 through photo-electric cell 20. This stops the bar 10. Owing to the relationship between cams 22 and 27, the bar 10 has travelled half the distance that the bar 26, and consequently mirror 36, has travelled. In this position of bar 10, actuating of solenoid 40 and exposure of strip 41 will cause a mark to be formed on the tape 11 which is exactly midway between the end of actual line of copy and the selected end of line. This is followed by release of the brake and return of bars 10 and 26 to the starting position.

For justification by the optical method described in pending application No. 825,524, filed on July 7, 1959, now Pat. No. 3,051,051, the line of copy requires to be centered in a justification unit and a centering stop mark is applied in the same manner as described above for centering of the copy in the make-up unit. An additional signal, however, has to be applied to indicate that the line is to be justified and this is done by employing a double-acting solenoid 40 so that the strip 41 is ejected an additional distance upwards to provide a longer line. The extension of the line thus formed may be used in the justification unit, after centering, for actuating the justification system.

The throws of the cams 22 and 27 are made to accord with the required movements of bars 10 and 26 for applying the stop marks referred to.

The actual line of copy may on occasion over-run the selected end of line and to provide for this eventuality the sensing system carried by carriage 30, 31 and 32 may be offset away from the sensing system, lens 15 and mirror 16, carried by carrier bar 10 and this offset may be corrected by moving the tape 11 by means of the carrier bar 10 the required distance before commencing the sensing operation to apply the stop marks.

Though the system has been described utilising a strip 41 and solenoid 40 to apply various stop marks, normally a stop mark will be provided by the character matrix and will be projected onto the tape.

The stop marks referred to above may be used in the make-up unit in the following manner.

The tape which has been exposed and developed is fed through the make-up machine by a carrier and cam drive similar in operation to that described above. The sensing mirror on the carried bar is however positioned to sense the mark formed on the tape below the copy area so that the film is gripped carrying the stop mark to a standard rest position. This stop mark which is put on the film at the time of the keyboard operation controls the typographical alignment of the line. The sensing mirror carried by the bar of the make-up machine is preset so as to be half the distance of the required length of line away from the centre of the optical system of the make-up machine in its rest position.

Thus depending on the stop marks applied to the lines of copy, the lines are left-hand aligned, right-hand aligned or centered.

For justification the centering takes place in a similar manner to that for make-up. When a line has been centered magnification or reduction may be effected by movement of a lens system as described in pending application No. 825,524, filed on July 7, 1959. A sensing mirror mounted on a shutter between the film or plate on which the justified lines are to be reproduced and the optical system and located to pick up a signal aligned on the beginning of copy line of the reproduced lines senses the beginning of copy signal of the line of the tape when the required magnification or reduction has taken place and reflects this onto a photo-electric cell to actuate a brake to stop the movement of the lens system. The shutter is then operated to expose the line and the lens system returned to its rest position.

Figures 4, 5:
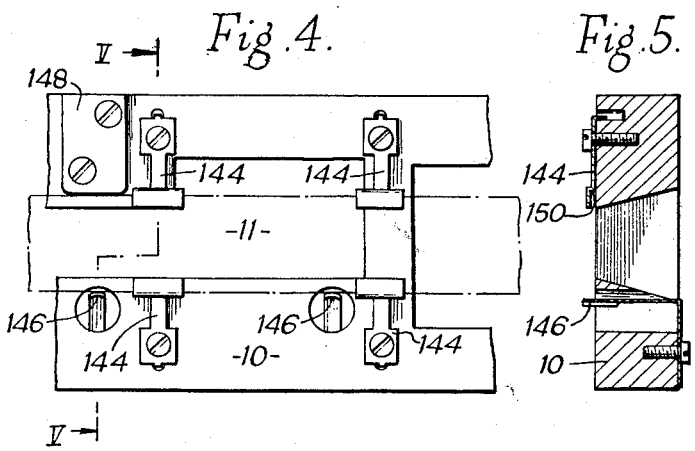
FIG. 4 is an enlarged view of part of the construction shown in FIG. 2.
FIG. 5 is a section on the line V—V of FIG. 4.

Referring to FIGS. 2 to 5, these show a convenient construction embodying the tape advancing means and sensing means shown diagrammatically in FIG. 1. For the sake of clarity similar elements are indicated by the same reference numerals as are employed in FIG. 1. FIG. 4 in an enlarged view shows in greater detail the projection area IV of the construction shown in FIG. 2.

In the construction of FIGS. 2 to 6, 10 is the carrier bar which is arranged to slide longitudinally to and fro between roller bearings 100 and 102 at the bottom and spring-loaded roller bearing 104 at the top, provided in a framework 106. 11 is the radiation sensitive tape which moves over a longitudinal opening 108 in the bar 10. 12 and 13 are the releasable grippers which are carried by, and move with, the carrier bar 10. 24 and 25 are the releasable grippers which remain stationary and in this case are attached to the framework 106. The grippers 12, 13, 24 and 25 all operate in the same fashion. Each is formed of a plate 110 (see gripers 13 and 25, FIG. 3) provided with two spaced gripping projections 112 arranged to grip the tape at the top and bottom edges between themselves and the surface of the bar 10 (or the framework 106 as the case may be) on pivoting of the plate 110 about a pivot 114 carried from the bar 10 (or framework 106), when a solenoid 116 is energised to move its armature 118 against the remote end of the plate 110. The solenoids 116 for grippers 12 and 13 are mounted on the bar 10 on the side remote from the gripper plates 110 and their armatures 118 pass through openings formed in the carrier bar 10. The solenoids 116 for grippers 24 and 25 are similarly mounted on the framework 106. Carried by a bracket 14 attached to bar 10 is a lens 15 and mirror 16 arranged to project light passing along the optical projection path of the system through the bar 10 just above the tape 11 onto the photoelectric cell 120 (20 in FIG. 1). The lens is held in a mount with slotted holes 122 to permit of adjusting its position. The photo-electric cell 120 is mounted in a tube 124 carried by brackets 126 attached to the frame 106. A metal strip 128 formed with a slit is free to slide through the tube 128 and behind it are arranged a lens 130 and apertured diaphragm 132. Leads to the cell 120 may pass through the grommet 134 provided in the end closure cap 136 of tube 128. The tube 128 is mounted so as to be movable along its axis and is clamped to the bracket by pinch screws (not shown). As described with reference to FIG. 1, the carrier bar 10 is driven by an eccentric cam 22 rotating with shaft 23 passing through a bearing in the frame 106. The cam 22 engages a roller 134 mounted at the end of bar 10 and the bar 10 is biassed to make contact with the cam 10 by a spring 135 which is attached to the bar 10 at one end and to the frame 106 at the other end.

The brake 21 for the carrier bar 10 is formed with two floating brake shoes 136 carried by a lever 138 pivotally mounted on frame 106 and moved at one end by the armature 140 of solenoid 142 carried on the frame 106 and arranged to be energised by the action of the cell 120. 43 is the heater for developing the tape as previously described, but in this case is a radiant heater, provided with a movable shutter.

From FIG. 4 it will be seen that the tape 11 is held against the bar 10 by four spring clips 144 and is urged upwardly by strip springs 146 to make contact with the lower surface of block 148 and inner ledges 150 formed in the upper spring clips 144 for correctly positioning the tape 11.

The operation of the unit just described to sense character widths and advance the tape in intermittent steps corresponding to the character widths will be evident from the description relating to FIG. 1.

The second bar 26 referred to in FIG. 1 is in this construction mounted in front of and above carrier bar 10. It moves longitudinally between two pairs of rollers 152 carried by the framework 106. In the present instance the sensing system used for positioning the tape 11 for the application of the various stop marks and corresponding to lens 33, mirror 34, lens 35 and mirrors 37 and 42, is always attached to bar 26 and comprises lens 154, mirrors 156 and 158 and lens 160. This system picks up light reflected from a light source by mirror 162 which after passing through the tape 11 is reflected onto a second photo-electric cell 164 similarly mounted as cell 120 in a tube carried by brackets from frame 106. The sensing system of elements 154, 156, 158 and 160 is carried by a mounting 168 which is movable on bar 26 and can be fixed in position by screw 170. One end of the bar 26 is linked by two coiled spring links 172 arranged on each side thereof on a pin 174 to the lower end of a lever 176 hooking over pin 178 passing therethrough. The lever 176 is pivoted on a pin 180 extending from frame 106 and as it rotates it moves bar 26 longitudinally. A bent lever 182 engages at its lower end the end of carrier bar 10 and may pivot on fixed knife edge 184 (fixed to frame 106) or knife edge 186 also mounted on frame 106 but which is movable and may be moved into the operative pivoting position by energisation of solenoid 187. The upper end of bent lever 182 contacts the upper end of lever 176. The bar 26 is biassed to move towards the left (looking at FIG. 2) by spring 188 attached at one end to a bar 26 and at the other end to the frame 106.

Knife edge 184 is so positioned that when it is operative as the pivot of lever 182 any movement of carrier bar 10 is translated by levers 182 and 176 into double this movement for bar 26 i.e. bar 26 will travel double the distance that carrier bar 10 travels. On the other hand when knife edge 186 becomes operative bar 26 will travel the same distance as carrier bar 10 when the latter is moved.

It will be appreciated that in the construction just described the mounting 168, corresponding to the crosspiece 32 of FIG. 1, is always attached to move with bar 26 and the variation from the 2:1 to 1:1 movement, relative to bar 10, is obtained by making the knife edge 186 the operative pivot of lever 182 instead of knife edge 184. Thus the need to attach the sensing system carried by mounting 168 to carrier bar 10 is dispensed with. The operation of bar 10 in the application of the various stop marks to tape 11 will be obvious from the description relating to FIG. 1.

As can be seen from FIG. 2 a second cam 190 is provided to co-operate with an extension 192 carried by bar 10. The cam 190 may be manually or otherwise operated to make any additional adjustments required.

Figure 6:
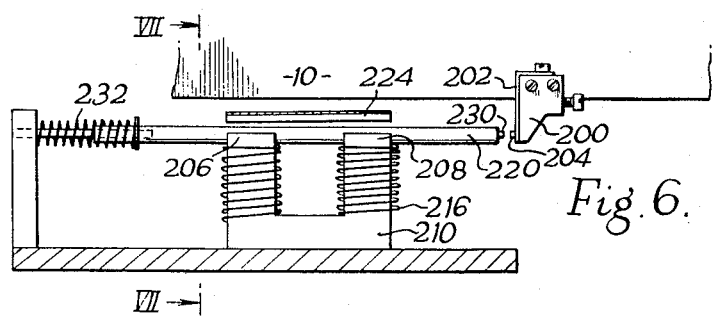
FIG. 6 is a fragmentary elevation illustrating a modified form of the construction shown in FIGS. 2 and 3.
Figure 7:
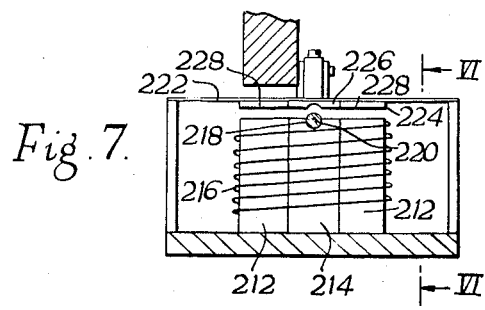
FIG. 7 is a section on the line VII—VII of FIG. 6.

FIGS. 6 and 7 illustrate the modified form of construction in which a follower is used with the carrier bar. In this form of construction there is attached to one side of the carrier bar 10 a block 200 which projects outwardly and downwardly and carries two strip-like springs 202 (one only shown) each of which is formed with a contact button 204 on the face facing the starting position of the carrier bar. Fixedly mounted below and to one side of the carrier bar 10 with its poles 206, 208 extending upwardly is a U-shaped electro-magnet 210 of laminated construction and formed of U-shaped outer layers 212 of soft iron and a central, similarly shaped layer 214 of non-magnetic material, for example Tufnel. A coiled winding 216 surrounds each complete limb of the laminated U-shaped construction. Mounted in a groove 218 formed in the upper edges of the non-magnetic layer 214 to slide to and fro in the direction that the carrier bar moves is a thin tube 220 made of stainless steel or other non-magnetic material. The surface of this tube, which constitutes the follower hereinbefore referred to, protrudes slightly above the surface of the poles of the magnet and the non-magnetic material 214. Held by a fixed resilient diaphragm 222 above the poles of the magnet and just clearing the protruding surface of the thin tube 220 is a vertically laminated armature 224, the centre layer 226 of which is formed of a non-magnetic material such as Tufnel and extends in the direction of the thin tube and the outer layers 228 of which are formed of soft iron. The positioning of the magnet 210 and thin tube 220 is such that one end of the tube, which lies parallel to the carrier bar, may be brought into contact with the face of the projecting block 200 of the carrier bar 10. This end of the thin tube 220, which may be referred to as the rear end, is provided with two electrical contacts 230 (one only shown) which are insulated from each other and the tube 220 and are adapted to make contact with the respective spring contacts 204 carried by the block. The tube 210 is resiliently biassed by spring 232 to urge the tube into contact with the block 200 and exert sufficient force to overcome any resistance of the spring contacts 204. The circuit made by one contact 230 on the tube 220 and a spring contact 204 on the block is the operative circuit for the solenoids of the electromagnetic grippers carried by the carrier bar 10. The circuit made by the other contact 230 on the tube 220 and the other spring contact 204 on the block 200 is a shunt circuit which serves to short-circuit the energising current for the electromagnet 210 carrying the thin tube 220. Neither of these circuits can be made during the movement of the carrier bar 10 away from its fixed starting position as a cam run in synchronism with the driving cam of the carrier bar 10 keeps switches provided in these circuits in the open position until the carrier bar 10 starts its return movement. At this point these switches are closed so that the two circuits referred to are then fully controlled by the respective contacts on the tube 220 and on the block 200 attached to the carrier bar 10.

When commencing operation the carrier bar 10 is in its fixed starting position with the tube or follower 220 in contact with the block 200 attached to the carrier bar. The carrier bar 10 then moves away from its fixed starting position resiliently biased to maintain contact with its driving cam and with the electromagnetic grippers carried by it in the release position. This action takes place during the exposure of a character as hereinbefore described. However, when the character width light signal is picked up by the mirror carried by the carrier bar and reflected onto a photo-electric cell, this serves to energise the electromagnet 210 carrying the thin tube or follower 220 which results in the armature 224 of the electromagnet being drawn downwardly towards the poles to grip the thin tube 220 between the layers 226 and 214. This prevents further movement of the thin tube 220, but the carrier bar 10 continues its movement away from its fixed starting position and contact between the thin tube 220 and the projecting block 200 of the carrier bar is broken. When the carrier bar 10 has completed its outward movement it commences its return movement and during this return movement the spring contacts 204 on the block 200 make contact with the contact buttons 230 on the thin tube 220. The coming together of the one pair of electrical contacts makes the circuit to energise the electromagnetic grippers of the carrier bar 10 to grip the radiation-sensitive tape and the coming together of the pair of contacts has the effect of de-energising the electromagnet 210 which leaves the armature 224 free to be moved away by its resilient diaphragm support 222 and thus free the thin tube 220 for further movement. The continued movement of the carrier bar 10 thus advances the tape and also takes back the follower or thin tube 220 to its starting position.

The spring biassing of the follower 220 is such as to insure that the follower 220 moves in contact with the projecting block 200 of the carrier bar in the outward movement of the latter until the brake comes into operation.

The spring contacts 204 attached to the projecting block 200 of the carrier bar are separately adjustable in position by screws 234 (one only shown) and each may be moved forward of the face of the block 200 to make contact with the corresponding contacts on the follower tube 220 before the block 200 itself in effect contacts the follower 220 to move the follower.

It will be appreciated that by the use of adjustable spring contacts on the block 200 attached to the carrier bar 10, or alternatively of such contacts on the follower 220, time lags in response can easily be compensated for and any variations desired in the timing of operations can also easily be effected.

Furthermore, by the use of a light-weight follower to set the distance to be advanced, the braking apparatus can be reduced in size and be made much more effective and consistent in operation without the use of an excessive amount of energy.

It will be appreciated from the foregoing that in the means of the invention actual linear dimensions (and not coded information) are used as the signals controlling movements, though only one end of the dimension may be projected as the signal when the other end is fixed. Furthermore a signal representing an optically changing dimension may be used, as in optical justification, the signal becoming effective to stop a movement when it coincides with the required dimension.

I claim:

1. Photographic type composing apparatus in which successive lines of characters are photographically composed by optical projection of the characters successively onto a radiation sensitive tape, which apparatus comprises a tape transport bar which moves from and to a fixed starting position taking the tape with it during its return movements to advance the tape in intermittent steps between successive projections of characters, an optical projection system for projecting a linear dimension signal associated with each character during the projection of the character, a sensing device carried by the tape transport bar for sensing the projected signal during the movement of the tape transport bar outwardly from the fixed starting position, means actuated by said sensing device controlling the distance the tape is advanced during the return movement of the transport bar, and a second bar arranged to be moved in parallel relationship with said tape transport bar by means which are controlled by the movement of the tape transport bar and are adjustable to move the said second bar either the same distance or double the distance the transport bar moves, the second bar carrying a second sensing device spaced from the said first-mentioned sensing device a distance equal to the selected length of line.

2. Photographic type composing apparatus as claimed in claim 1, in which the tape transport bar acts to drive the said second bar through a lever, provided with two pivoting points either of which can be made operative at choice, the one pivot point representing a 1:1 and the other pivot point a 1:2 relationship between the movements of the tape transport bar and the said second bar.

3. In photographic type composing apparatus in which images of characters of varying widths are intermittently and successively projected onto a radiation sensitive tape to form lines of characters thereon, means for advancing the tape the required character width between successive character projections, which means comprise a movable carrier, means for moving the carrier parallel with the tape outwardly from a fixed starting position, means for returning the carrier along the same path to its fixed starting position, releasable grippers attached to the carrier and arranged to be in the release position during the outward movement of the carrier and to grip the tape during the return movement, braking means for stopping the carrier during its outward movement, a radiation-sensitive device arranged to actuate the braking means on receipt of a radiation signal, a sensing device carried by the carrier and adapted to transmit a radiation signal to the radiation-sensitive device, the sensing device being aligned on the front body line of a character (relative to direction of movement) in the projection area when the carrier is in its starting position, optical means for projecting a radiation signal aligned substantially on the rear body line of the character during the projection of an image of the character, whereby on projecting said signal during the outward movement of the carrier with the gripping device in the release position, the signal is picked up by the sensing device and transmitted to the radiation-sensitive device to actuate the braking means and stop further movement of the carrier which, when the projection of said signal ceases, is released to be returned to its starting position with the gripping device gripping the tape, and thus advance the tape a distance equivalent to the width of the character which has been projected onto the tape.

4. In photographic type composing apparatus in which images of characters of varying widths are intermittently and successively projected onto a radiation sensitive tape to form lines of characters thereon, means for advancing the tape the required character width between successive character projections, which means comprise a movable carrier arranged to perform an outward and return movement of fixed dimension from a fixed starting position, releasable grippers attached to the carrier and adapted to grip the tape, a follower lighter in weight than the carrier and biased to move with the carrier during the outward movement of the carrier and arranged to be returned to its starting position by the carrier during the return movement of the latter, braking means for stopping the follower during its outward movement, means for releasing the braking means to permit the return movement of the follower, means for actuating the grippers to grip the tape when the follower commences its return movement and means for releasing the grippers when the follower completes its return movement, a radiation-sensitive device arranged to actuate the braking means on receipt of a radiation signal, a sensing device carried by the carrier and adapted to transmit radiation signals picked up by it to the radiation-sensitive device, the sensing device being aligned on the front body line of a character (relative to direction of movement) in the projection area when the carrier is in its starting position, optical means for projecting a radiation signal aligned substantially on the rear body line of the character, during the projection of an image of the character, whereby on projecting said signal during the outward movement of the carrier with the grippers in the release position, the signal is picked up by the sensing device and transmitted to the radiation sensitive device to actuate the braking means and stop further movement of the follower, the follower being released by the returning carrier to return with it and the grippers being actuated to grip the tape when the carrier contacts the follower during the return movement of the carrier.

5. Means for advancing a movable element in intermittent steps of varying dimensions which comprises a movable carrier arranged to perform an outward and return movement of fixed dimension from a fixed starting position, releasable grippers carried by the carrier and adapted to grip the movable element, a follower lighter in weight than the carrier and biassed to move with the carrier during the outward movement of the carrier and arranged to be returned to its starting position by the carrier during the return movement of the latter, braking means for stopping the movement of the follower during its outward movement, means for releasing the braking means to permit the return movement of the follower, means for actuating the grippers to grip the movable element when the follower commences its return movement, and means for releasing the grippers when the follower or carrier completes the return movement, a radiation sensitive device arranged to actuate the braking means on receipt of a projected signal, means for locating a signal with respect to said fixed starting position to directly represent the dimension of a step, an optical projection system for projecting the located signal during the outward movement of the carrier and a sensing device carried by the carrier for sensing said signal and transmitting it to the radiation sensitive device, the braking means being released to permit of the return of the follower when the carrier makes contact with the follower during the return movement of the carrier.

6. In photographic type composing apparatus in which successive lines of characters are photographically composed by optical projection of representations of individual characters selected from a character matrix, successively onto a radiation sensitive tape, a tape transport bar which moves from and to a fixed starting position taking the tape with it only during its return movements to advance the tape in intermittent steps between successive projections of characters, a thin line aperture associated with each character representation and positioned outside the exposure area of the character itself substantially in line with one body line of the character, which when the character is in position for projection will be the rear body line relative to direction of movement of the tape, an optical projection system for projecting an image of said thin line aperture during the projection of the character with which it is associated, a sensing device carried by the tape transport bar and aligned on the other body line of the character in the projection area when the tape transport bar is in its starting position, for sensing the projected image of the thin line aperture during the movement of the tape transport bar outwardly from the fixed starting position and means actuated by said sensing device controlling the distance the tape is advanced during the return movement of the transport bar.

7. Means for advancing a movable element in intermittent steps of varying dimensions, comprising a movable carrier which moves from and returns to a fixed starting position and takes the movable element with it when returning to its fixed starting position, braking means for stopping the movement of the carrier during its outward movement, a radiation sensitive device arranged to actuate the braking means on receipt of a radiation signal, means for locating a signal at a distance from said fixed starting position representing the distance to be moved by the movable element, optical projection means for projecting the located signal during the outward movement of the carrier and a reflecting sensing device carried by the carrier for sensing the projected signal and reflecting it onto the radiation sensitive device, the braking means being released to permit of the return of the carrier, taking the movable element with it, to its fixed starting position when the projection of the said signal ceases.

References Cited in the file of this patent

UNITED STATES PATENTS

| | | |
|---|---|---|
| 2,160,750 | Meyer | May 30, 1939 |
| 2,250,209 | Shoults | July 22, 1941 |
| 2,388,423 | Langdon | Nov. 6, 1945 |
| 2,406,299 | Koulicovitch | Aug. 20, 1946 |
| 2,742,830 | Wirtz | Apr. 24, 1956 |
| 2,780,151 | Borisof | Feb. 5, 1957 |
| 2,923,212 | Corrado | Feb. 2, 1960 |
| 2,978,969 | Heine | Apr. 11, 1961 |

FOREIGN PATENTS

| | | |
|---|---|---|
| 912,417 | Germany | May 28, 1954 |
| 1,113,397 | France | Dec. 5, 1955 |
| 821,895 | Great Britain | Oct. 14, 1959 |